United States Patent [19]
Hannah et al.

[11] Patent Number: 5,393,544
[45] Date of Patent: Feb. 28, 1995

[54] PROCESS FOR PREPARING FAT FREE FROZEN FRENCH FRY STYLE POTATOES

[76] Inventors: Scott C. Hannah, 2700 Richards Rd., Bellevue, Wash. 98005; David J. Yanda, 211 Harvest Ct., Manitowoc, Wis. 54220

[21] Appl. No.: 171,341

[22] Filed: Dec. 20, 1993

Related U.S. Application Data

[63] Continuation of Ser. No. 882,477, May 13, 1992, abandoned.

[51] Int. Cl.⁶ ............................................. A23L 1/217
[52] U.S. Cl. .................... 426/250; 426/268; 426/509; 426/510; 426/637
[58] Field of Search ............... 426/241, 243, 250, 262, 426/268, 637, 456, 464, 509, 510, 482, 483, 518

[56] References Cited

U.S. PATENT DOCUMENTS

| | | | |
|---|---|---|---|
| 3,394,012 | 7/1968 | Koltun et al. | 426/482 X |
| 3,644,129 | 2/1972 | Sloan | 426/456 X |
| 4,082,855 | 4/1978 | Citti et al. | 426/250 |
| 4,084,008 | 4/1978 | Yueh et al. | 426/510 X |
| 4,380,553 | 4/1983 | Schmidt | 426/250 |
| 4,389,424 | 6/1983 | Hasegawa | 426/637 X |
| 4,542,030 | 9/1985 | Haury et al. | 426/637 X |
| 4,957,761 | 9/1990 | Hale | 426/509 X |

OTHER PUBLICATIONS

Smith, *Potatoes: Production, Storing, Processing*, 2d ed., 1977, pp. 693–699 & 715.

*Primary Examiner*—Arthur L. Corbin
*Attorney, Agent, or Firm*—Christensen, O'Connor, Johnson & Kindness

[57] ABSTRACT

The process for preparing fat-free frozen french fry style potatoes utilizes the steps of: preheating raw peeled potatoes; cutting the preheated and peeled potatoes; blanching the preheated, peeled and cut potatoes to remove excess sugars, to gelatinize starch, to remove the gelatinized starch, and to inactivate the enzymes during subsequent handling, freezing, and holding periods; drying the preheated, peeled, cut, and blanched potatoes; then freezing the reheated, peeled, cut, blanched and dried potatoes; and for convenient handling, packing the frozen potatoes in selected containers which are kept within frozen storage volumes until used in preparing a meal.

11 Claims, 1 Drawing Sheet

PROCESS FOR PREPARING FAT FREE FROZEN FRENCH FRY STYLE POTATOES

This application is a continuation application based on prior copending U.S. patent application Ser. No. 07/882,477, filed on May 13, 1992, now abandoned.

BACKGROUND

Frozen french fries, as defined in explicit USDA specifications 52.2391 effective Feb. 8, 1967, are processed throughout the year from raw potatoes. Some six billion plus pounds of frozen french fries are produced each year in the United States. One hundred percent of them are finished off with an oil blanch just prior to freezing. In addition to these frozen french fries produced in reference to these United States Department of Agricultural specifications, a U.S. patent search resulted in the consideration of the following patents to determine how other potato products were made.

In U.S. Pat. No. 4,906,483 of 1990, Sharon C. Kloos describes and illustrates her No-Fat, No-Cholesterol, Salt-Free Potato Cooking Process for making potato chips and french fry-like potatoes. Her process, based on her use of her home kitchen equipment, includes the steps of microwave cooking sliced potatoes in water for purposes of releasing undesirable potato starch from the potatoes utilizing a transparent color transformation as an indicator of doneness. Once the potatoes have gone the color transformation the hot water is dumped and the potatoes are rinsed in cold water to remove visible potato starch. After rinsing the potatoes are then arranged in a planar fashion on a non-stick cooking sheet and placed in a conventional radiant heat oven for browning and crispening to produce a no-fat, no cholesterol, salt-free potato product. After crispening and browning the potato product is ready for consumption or prepared for packing, such as by freezing, for later consumption using known packaging methods.

In U.S. Pat. No. 3,175,914 of 1965, Frederick H. Vahlsing Jr., described his method of treating potato solids to develop their uniform color and palatableness, especially with respect to frozen french fried potatoes. He described a specific example of his process as follows: strips of potatoes, having the shape necessary for frozen French fried potatoes, were immersed in water at a temperature of 190° F. for approximately 3 minutes. This resulted in gelatinization of the surface layer of the potato solids. Thereafter, the potatoes were placed in a second tank and wash water at a temperature of 75° F. was continuously passed over the potatoes for approximately 2 minutes. Thereafter, the potatoes were immersed in an aqueous suspension containing 5% gelatinized corn starch and 0.5% sodium acid pyrophosphate at a temperature of about 140° F. and for approximately 2 minutes. The potatoes were then removed from the starch suspension solution, excess of which was shaken off them and then they were fried in hot hydrogenated cottonseed oil at a temperature of 360° F. for about 1½ minutes. The potatoes developed a rich golden color and were immediately frozen at −20° F.

In U.S. Pat. No. 3,946,116 of 1976, Messrs. Merle L. Weaver, Earl Hautala, and Masahide Nonaka, illustrated and described their preformed potato products. They cooked and then mashed potatoes. Thereafter, they shaped the mashed potatoes into potato strips. The surfaces of these potato strips were then case-hardened by using hot air. These hardened potato strips were then fried directly, frozen, or held in cold storage. After frying them, they had the taste, appearance, color and texture of high quality conventional french fries. They had added advantages of higher solids content, lower fat content, and no tendency to get limp.

In U.S. Pat. No. 4,058,631 of 1977, Charles F. Roan described his enzyme-treated fried starchy foods. The treatment occurred prior to frying in fats and oils, to reduce their absorption of fat during the frying, and to improve their flavor. The treatment involved coating the surfaces of these starchy foods with an aqueous solution of alpha amylase enzyme.

In U.S. Pat. No. 4,269,861 of 1981, Messrs. Andrew A. Caridis, Clark K. Benson, Steven G. Leary, and Arthur A. Nilsen illustrated and described their process for preparing french fried potatoes and the apparatus they used to obtain a pre-fried potato product with a low oil content of about 3% to 7%.

In U.S. Pat. No. 4,542,030 of 1985, Messrs. John F. Haury and Charles T. Hensley described their process for preparing low calorie french fry product. Potato strips, obtained by following conventional peeling, slicing, and blanching steps, but before frying in oil or spraying them with oil, were immersed in a "sugar drag" containing sodium acid pyrophosphate and caramel, and optionally glucose to create a coating on these potato strips. Thereafter, during the frying process, and even more so during the preparation of the french fry product in a home oven, the presence of this coating results in a darkening of the product, presenting french fries having a lower calorie content and a pleasing color. The greatly diminished oil content, in the range of 25% to 75% less, is responsible for the lower calorie content. However, Messrs. Haury and Hensley's low calories french fry product still contained fat and maintained a higher calorie content than many prospective customers would want.

In U.S. Pat. No. 4,917,908 of 1990, William E. Prosise described his reduced oil french fried potato products and process for preparing them. After peeling and cutting the raw potatoes, they were coated with polyvinylpyrrolidone, via dipping into an aqueous solution of it or being sprayed with it, and thereafter this coating was dried. Thereafter these coated potato pieces were deep fried in oil to produce a finished french fry potato food product. During this frying the coating provided resistance to oil absorption, reducing the oil content by 20%.

In U.S. Pat. No. 5,000,970 of 1991, Messrs. Sudhakar P. Shaubhag and Joseph J. Cousminer illustrate and describe their process for preparing reheatable french fried potatoes. When they are reheated to a consumption temperature they closely simulate the color, texture, aroma, flavor, and mouthfeel of french fries prepared at fast food restaurants by deep fat frying. In their process they parfry potato strips after blanching them. They are then cooled. Subsequently, they are dust coated with potato granules providing a thin coherent coating. Finished frying follows, thereby cooking the dust coated potato strips into a fully cooked ready-to-eat product. Thereafter these fried coated potato strips are frozen. In U.S. Pat. No. 4,957,761 of 1990, Douglas B. Hale described his potato preservation method to provide fresh, uncooked, pre-cut, and peeled potatoes available in the refrigeration sections of supermarkets, etc., ready to be cooked. By so doing, he saved the consumer from the trouble of having to peel and cut them. The potatoes were fresh, uncooked, and not frozen. The potatoes retained more of their natural starch, vitamins, taste, and texture. Mr. Hale's method for preserving these pre-cut, uncooked potatoes for storage at refrigeration temperatures comprised the steps of:

a) blanching pre-peeled, pre-cut potatoes to seal the outer surface without cooking the inside of the potatoes;

b) rapidly cooling the blanched potatoes to below 45 degrees Fahrenheit;

c) drying the cooled potatoes; and d) vacuum packaging the dried potatoes in an inert gas.

In U.S. Pat. No. 4,389,424 of 1983, Hiroshi Hasegawa described his production of semi-processed fried potato pieces for preservation at room temperature. After potato pieces and strips were prepared by cutting, peeling, and washing, they were then immersed in an aqueous solution of an antioxidant, and a texture enhancing agent. Thereafter, these pieces and strips were washed and drained. Then they were prefried for partial drying in deep edible oil, to reduce their water content by 10 to 20 percent by weight. Afterwards, these pieces and strips were packaged in a gas-tight sealed bag under vacuum, and then sterilized by heating under pressure. These pre-processed potato pieces could be stored at room temperature for months. When used they were finally fried in deep oil or fat.

In U.S. Pat. No. 4,082,855 of 1978, Messrs. Citti and Dienst illustrated and described their process for producing a french fried potato product. They mixed mashed blanched potatoes and dehydrated potatoes along with an emulsifier into dough which they heated. Then this hot dough was extruded through a special die having an interior formed as a Maltese cross, thereby creating an elongated potato product simulating a french fry product. The final product was obtained by surrounding it in cooking fat in a deep frying process.

In U.S. Pat. No. 3,644,129 of 1972, Jerry L. Sloan disclosed his method of processing potatoes prior to their later combined freeze drying and air drying. Potato pieces were blanched, cooled, blanched again, and quick frozen. Thereafter, they were dehydrated by a combined freeze drying and air drying process which took less time and later resulted in better rehydration.

In U.S. Pat. No. 4,084,008 of 1978, Messrs. Yueh and Mueller described their instantized potato products and method of making same. After potatoes were washed, peeled, and cut, they were blanched for two minutes. Thereafter the bleached potato pieces were treated in a chemical bath. Then they were partially dehydrated to an overall moisture content of about 35-65%. Thereafter, the potato pieces were further dehydrated to a shelf stable moisture content of less than 10%. The resulting potato pieces were available to consumers, who quickly rehydrated them for use either without further cooking or with further cooking. The consumer electively used these potato pieces as fried potatoes, in potato salads, as scalloped potatoes, as creamed potatoes, as hash browns, and the like.

In U.S. Pat. No. 4,380,553 of 1983, Thomas R. Schmidt described his method of imparting a reddish color to seasoning salts. To do so, he added a food grade acid to an aqueous solution of annatto, lowering the pH sufficiently to precipitate the annatto into an aqueous slurry. Then Mr. Schmidt combined the annatto slurry with granulated seasoning salt, blending the resulting combination, wherein the salt was plated with the annatto and then dried.

In a publication of 1977, entitled, "Potatoes, Production, Storing, and Processing", Professor Ora Smith, Ph.D. wrote information concerning frozen french fries and other frozen potato products. Throughout his descriptions the processed potato pieces were fried, while exposed to fat. He discussed the various steps of: washing, peeling, trimming, sorting, cutting, blanching, frying, defatting by using vibrating screens, freezing, and packaging.

All of these prior inventors have tried to provide a better product, often reducing the fat, salt, and cholesterol, with Sharon C. Kloos leading the way. Using her home kitchen equipment she produces french fry like potatoes, and potato chips, which have no fat, no cholesterol and no salt, and yet are attractive from a dietary perspective. Yet there remains a need for yet another commercial process to create a commercial french fry like product, which is produced without using oil, and therefore may be considered a fat free french fry style potato product with color.

SUMMARY

A process commercially produces a fat free frozen french fry style potato, by utilizing many processing steps used in producing frozen french fries in a traditional manner, with the exception of a final main oil blanch prior to freezing. High solid quality processing potatoes are selected, preferably such as Russet Burbank potatoes. The product produced has the color appearance of a regular french fry, a texture and mouth-feel of a regular french fry, the crispness of a regular french fry, and the flavor of a good french fry or other potato product, yet the product is produced without using oil or fat. The handling, storage and packaging processing steps are similar to processing steps used in producing the annual six billion pounds of french fries, which are all finally blanched in oil. Color retention, inclusive of the addition of coloring, crispness, good flavor, no breakage, and holding power, are all obtainable in using this no oil process.

In respect to a preferred embodiment of this process, the potatoes are first preheated for easier peeling and handling. Then they are peeled in either a traditional knives process or steam process. Then they are cut to size by using urshel knives or water gun knives. The potato strips are then blanched in circulating hot water to remove excess sugars and starch materials, and also to inactivate enzyme activity for their subsequent proper freezing and holding. These fat free potato strips are then conveyed to a second bath or spray, containing a mixture of FDA approved additives, such as annatto coloring and some dextrose. The annatto actually dyes the potatoes to give them more of a french fry coloring. Also the dextrose will give added color if later on the potatoes, in the control of the customers, do in fact touch hot oil in final preparation for serving in home or elsewhere in any way. After the second bath or spray additive treatment, the potatoes are air dried, if necessary, to improve the solid content, by using, for example, hot air induction or shaker equipment. Shaker screens also are used to remove small bits and pieces of potatoes, which could downgrade the product. The shaking and screening equipment is optionally placed right after initial cutting equipment, or placed after the freezing equipment. The objective of this process is to produce fat free french fry style potatoes, and in so doing, to achieve a USDA specification which is the equivalent to Grade A Fancy, medium in length or better, potato product. The product is then frozen, and thereafter packaged by putting the potato product into retail or food service EVA polyethylene bags for distribution.

DRAWING

The present invention will now be described in greater detail, by way of example, with reference to the accompanying drawings which illustrate the steps of the preferred embodiment of the present inventive process, in which.

Figure 2:
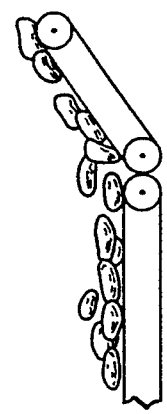
FIG. 2 illustrates conventional handling of such selected potatoes.
Figure 3:
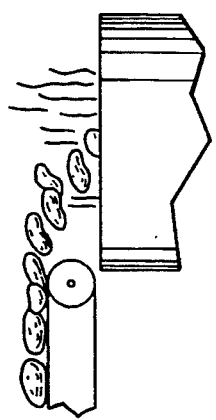
FIG. 3 illustrates heavy preheating of the thusly handled potatoes.
Figure 4:
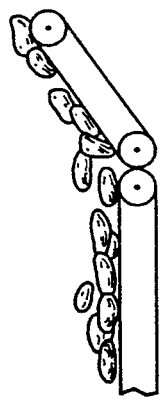
FIG. 4 illustrates conventional handling of the thusly preheated potatoes.
Figure 5:
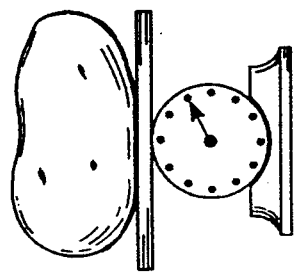
FIG. 5 illustrates cutting of the thusly handled potatoes into designated strips.
Figure 6:
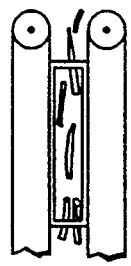
FIG. 6 illustrates extra screening steps to remove slivers from the thusly cut potatoes.
Figure 7:
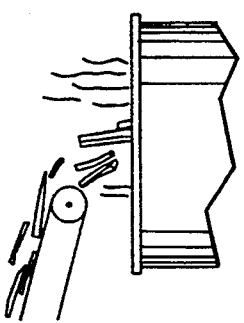
FIG. 7 illustrates short blanching with dextrose of the thusly screened potatoes.
Figure 8:
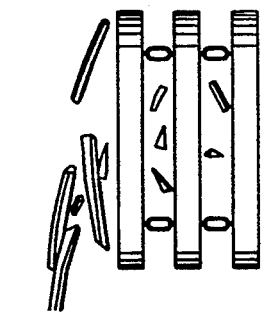
FIG. 8 illustrates conventional handling of the thusly blanched potatoes.
Figure 9:
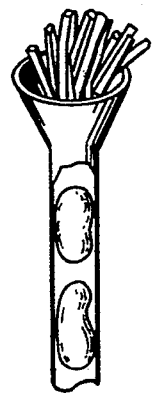
FIG. 9 illustrates an annatto and light caramel blanch treatment of the thusly handled potatoes.
Figure 10:
Figure 11:
Figure 1:
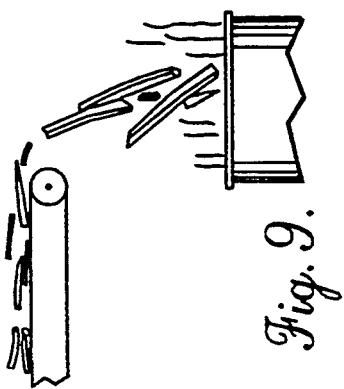
FIG. 1 illustrates the selection of high solids raw potatoes, such as Russet or Burbank potatoes.

FIG. 10 illustrates a shaker for conventional handling and annatto return of the thusly blanched potatoes; and FIG. 11 illustrates passage of the thusly handled potatoes through a drying tunnel to improve the solids content, which is followed by the additional conventional steps of moving the potato products over a shaking inspection table, freezing the potato products by passing on a conveyor through a freezing tunnel, moving the frozen potato products over screens, and packaging the screened frozen potato products.

DESCRIPTION OF PREFERRED EMBODIMENTS OF THE PROCESS FOR PREPARING FAT FREE FROZEN FRENCH FRY STYLE POTATOES

The commercial preparation of fat free french fry style potatoes, begins similarly with the current commercial preparation of french fried potatoes, with the exception that special care has to be taken with regards to solid content and variety of the raw inbound potatoes. The Russet Burbank variety of potatoes only, are recommended for best results. However, Kennebecks or Schebadys can be used if necessary. The important thing is to target the specific gravity of 1.085 for the potatoes, and to have the lower limit of testing be 1.08 specific gravity. This provides a starting solid content of 20.6%, an upper limit is 1.09 specific gravity.

When oil blanching or oil finishing of the traditional french fries, it is easier to control the solid content or adjust the solid content of the potatoes. However, with the absence of oil in this fat free process, two additional steps must be introduced into the process in order to produce the desired finished potato product. The first step is preheating, and the initial preparation begins with steam peeling or infrared treatment to loosen the skin. Then barrel tumblers are used to peel the potatoes, following current modern procedures. Then a second step is additionally recommended, wherein the potatoes are heated in water at 140 degrees for approximately ten minutes. This heating results in less breakage during handling and facilitates the potato cutting process, wherein the traditional french fry shapes are obtained without creating additional slivers and/or feathered ends of the cut potatoes. Slivers or feathered edged potato products tend to burn and to char in home and like preparations and their presence destroys the flavor of the remaining potato products. This is particularly critical in this oil free process. In contrast, regular oil blanched french fries have oil serving as an actual protector, during home and home like cooking processes, which thereby avoids the charring and burning. This is a significant point of this oil free process. Without preheating there tends to be more shattering of the potato product, which produces more broken pieces and irregular cuts, which in turn downgrade the potato product. The objective is to limit or control the amount of sharp or thin edges in the finished fat free potato products.

After cutting, the potato strips are blanched in water primarily to gelatinize the starch, remove excess sugars, and inactivate enzymes. This blanching is done by steaming or immersing the potato strips in water at approximately 190 to 195 degrees for about two minutes. During steaming, the raw potato strips are exposed to live steam for approximately ninety seconds. The variation of the heating times in water or steaming times, depends on primarily the thickness of the products and load size of the products being steam blanched, in respect to the cut sizes of potatoes being produced. The initial size of the potato product, after cutting, is preferred to be a 3/8" regular cut potato. The cut potato strips may need a spray wash, in order to help separate the potato pieces.

The potatoes then have their first mechanical grading separation, as they proceed over shaker screens to remove small bits, pieces and slivers. These bits, pieces and slivers are preferably ground or chopped into sizes, later serving as southern style hashbrowns. When they are so recovered and later processed a loss is avoided.

The potato strips and pieces then proceed into blanching. The initial blanching or enzyme treatment must be done with flowing water which is continuously replaced, in order to remove the soluble sugars and starches, which are undesirable in respect to further processing and which are not wanted in the potato strips. Another objective of this blanching is to decolorize or control the unwanted color variation of the potato strips. After this initial blanching involving the water flow and enzyme control, these potato portions may be washed again, if necessary.

Then they are directed into a stationary water tank containing annatto and optionally light caramel. Dextrose and sodium acid pyrophosphate, also referred to as SAPP, may be included additionally as an option in this water tank. It is not necessary for the dextrose or SAPP to be used. The sole use of annatto as a FDA approved food coloring, with the subsequent drying and immediate freezing of the potato pieces, can stabilize the coloring accurately. This is significant, because generally all potato processors have previously emphasizes the need for adding a coloring stabilizing chemical. In contrast, we have found, that with proper handling, chemical additives are not necessary.

If oil must be used by a consumer, any addition of glucose or dextrose or a sugar drag, leads to caramelizing in the presence of a slight amount of oil in a frying pan being used at home. We refer to this method as our "low fat cooking instructions".

If the potato products are to be strictly oven prepared, then the dextrose is unnecessary. In respect to avoiding losses, and keeping the smaller pieces in a process, we have found that our southern style hashbrowns and our shredded hashbrowns, which are totally fat free, are not suitable for oven preparation. These hashbrowns must preferably be fried using an extremely light oil spray in a frying pan. The dextrose helps significantly to add color by caramelizing.

The SAPP or color stabilizers used are suitable food additives and can minimize discoloration from inorganic ions in the processing water. This is necessary in certain growing conditions and certain times of the year.

The time in the coloring/secondary blanch tank is approximately one minute, and the temperature should be controlled in the range of 160 to 190 degrees. The potato products may then be conveyed to a drying tunnel, if necessary, whereby 180 degree air is blown down on or up through the potato product, until the sufficient solid content is achieved. The time of this air drying or shaking, will vary, depending on the solid content of the potato, once it emerges from the second tank or coloring tank. In respect to the content range, 30% can be considered minimum, and 34% can be considered maximum. Thirty two percent should be the target goal of solid content. The potato products may then be blast frozen, during traditional commercial blast freezing operations. Thereafter the fat free frozen french fry style potatoes are conveyed to packaging machinery for either retail packaging or food service packaging.

Our product is prepared for eating in a traditional home oven heating method at 450 degrees for 25 minutes, with the potatoes being placed in a single layer on a cookie sheet or tin. Our fat free frozen french fry style potatoes need not be placed in a frying pan with a very light oil spray or wipe. If they are, like our hashbrown potatoes could be, the amount of fat or oil absorption into our potato products is extremely minimal, in comparison to the fat and/or oil absorption into regular french fried or hashbrown potato products. It is not necessary to even cook our chopped hashbrowns in the frying pan. However, it is necessary to cook our shredded hashbrowns in a frying pan, as they cannot be cooked properly in an oven. It is noted, that in contrast, the deep frying of traditional french fries, provides a fat content of 12 grams per 3 ounce serving.

For food service in almost all school and care feeding the use of convection ovens has become quite popular. When using a convection oven, it is recommended that shoestring or ¼" cut potatoes be produced, in order to aid in preparation time at the school or care feeding institution. The shoestring cut ¼" potato would be processed exactly the same way as the retail use product. However, the solid content should be increased to a 34% target weight, with 32% weight being the lowest, and 36% weight being the highest. The necessary goal for the food service potato product is being able to convection oven cook the thinner potato cuts, arranged in a layer of approximately 1½" to 2" in a jumbled fashion, in a convection oven held at 450 degrees for 12 minutes.

In all our methods producing fat free frozen potato products, either in french fry style or hashbrown style, no oil has been introduced to the potato product. For production efficiency and market customer satisfaction, all fat free hashbrowns and other smaller pieces of the potato product, it is recommended that these pieces also be put through the coloring blancher along with the french fry strips in order to give them some color and possibly a dextrose coating for coloring when light frying at home. The key shaker or separation process step would then occur after drying and freezing, whereby the products can be shaken through three screens, with the top screen being associated with the Grade A longer product french fry, the middle screen being associated with the excess short bits and pieces, and the bottom screen being associated with pieces, which are small enough to be directly used as hashbrowns. The middle screen associated potato products may be chopped and then blended in with the lower screen potato products to produce the finished southern style hashbrown product.

Our objective is always to commercially produce fat free frozen potatoes centering on the production of french fry style potatoes, while still producing southern style hashbrowns, and hashbrowns.

We claim:

1. A process for producing fat-free frozen french fry style potatoes, comprising:
   a) peeling potatoes;
   b) preheating the peeled potatoes prior to cutting for a period of time sufficient to reduce shattering and slivering of the potatoes during cutting;
   c) cutting the preheated peeled potatoes into potato pieces;
   d) blanching the cut potato pieces in a fat-free medium;
   e) introducing an edible coloring agent to the cut potato pieces to impart a fried appearance to the potato pieces upon subsequent fat-free cooking;
   f) drying the blanched cut potato pieces, wherein after coloring and drying the potato pieces have a solids content of from 30 to 36 percent by weight;
   g) freezing the dried potato pieces to produce frozen fat-free potato pieces;
   h) mechanically grading the potato pieces, after cutting and prior to packaging, to remove broken bits and slivers that would burn during subsequent fat-free cooking; and
   i) packaging the dried, graded, frozen potato pieces, whereby the packaged potatoes are suitable for subsequent fat-free and substantially fat-free cooking to produce french fry style potatoes having an acceptable color and texture.

2. The process of claim 1, further comprising the step of selecting raw potatoes having a specific gravity of from 1.08 to 1.09 prior to peeling the potatoes.

3. The process of claim 2, wherein the blanched, cut potato pieces are dried to a solids content of from 30 to 34 percent by weight.

4. The process of claim 1, wherein the step (a) of peeling the potatoes comprises a first preheating step to loosen the potato skin followed by removal of the loosened skin, and the step (b) of preheating the peeled potatoes comprises a second preheating step.

5. The process of claim 4, wherein the second preheating step is carried out at 140° F. for 10 minutes.

6. The process of claim 1, wherein the step of blanching the cut potato pieces comprises a first blanching substep in a first fat-free medium, followed by introduction to a second fat-free medium for a second blanching substep, wherein the coloring agent is introduced to the cut potato pieces during the second blanching substep.

7. The process of claim 6, wherein the first blanching substep is carried out in a stream of hot water or steam to gelatinize starch within the potato pieces, remove excess sugars, and inactivate enzymes, and the second blanching substep is carried out in a hot water bath containing the coloring agent.

8. The process of claim 1, wherein the coloring agent is selected from the group consisting of annatto, caramel, dextrose, and mixtures thereof.

9. The process of claim 1, further comprising the step of cooking the frozen potato pieces to produce fat-free or low fat french fry style potatoes.

10. A process for producing fat-free frozen french fry style potatoes, comprising:
 a) selecting raw potatoes having a specific gravity of from 1.08 to 1.09;
 b) peeling the selected potatoes;
 c) preheating the peeled potatoes prior to cutting for a period of time sufficient to reduce shattering and slivering of the potatoes during cutting;
 a) cutting the preheated peeled potatoes into potato pieces;
 e) blanching the cut potato pieces in a fat-free medium;
 f) drying the blanched cut potato pieces to a solids content of from 30 to 36 percent by weight;
 g) freezing the dried potato pieces to produce frozen fat-free potato pieces;
 h) mechanically grading the potato pieces, after cutting, and prior to packaging, to remove broken bits and slivers that would burn during subsequent fat-free cooking; and
 i) packaging the dried, graded, frozen potato pieces, whereby the packaged potatoes are suitable for subsequent fat-free and substantially fat-free cooking to produce french fry style potatoes having an acceptable appearance and texture.

11. A process for producing fat-free frozen french fry style potatoes, comprising:
 a) peeling potatoes;
 b) preheating the peeled potatoes prior to cutting for a period of time sufficient to reduce shattering and slivering of the potatoes during cutting;
 c) cutting the preheated peeled potatoes into potato pieces;
 d) blanching the cut potato pieces in a fat-free medium;
 e) drying the blanched cut potato pieces to a solids content of from 30 to 36 percent by weight;
 f) freezing the dried potato pieces to produce frozen fat-free potato pieces;
 g) mechanically grading the potato pieces, after cutting and prior to packaging, to remove broken bits and slivers that would burn during subsequent fat-free cooking; and
 h) packaging the dried, graded, frozen potato pieces, whereby the packaged potatoes are suitable for subsequent fat-free and substantially fat-free cooking to produce french fry style potatoes having an acceptable appearance and texture.

* * * * *